(12) United States Patent
Liu et al.

(10) Patent No.: US 11,838,188 B1
(45) Date of Patent: Dec. 5, 2023

(54) SYSTEMS AND METHODS FOR CONTROL OF APPLICATIONS BASED ON QUALITY OF SERVICE MONITORING

(71) Applicant: Verizon Patent and Licensing Inc., Basking Ridge, NJ (US)

(72) Inventors: David Damin Liu, Livermore, CA (US); Rishi Tandon, Gurugram (IN); Kristen Sydney Young, Mine Hill, NJ (US); Yueping Zhang, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/933,244

(22) Filed: Sep. 19, 2022

(51) Int. Cl.
*G06F 15/173* (2006.01)
*H04L 41/5003* (2022.01)
*H04L 41/0823* (2022.01)
*G06F 15/16* (2006.01)

(52) U.S. Cl.
CPC ...... *H04L 41/5003* (2013.01); *H04L 41/0823* (2013.01)

(58) Field of Classification Search
CPC .................. H04L 41/5003; H04L 41/0823

USPC ......................................................... 709/224
See application file for complete search history.

(56) References Cited

PUBLICATIONS

Broadcom, "BCM88690 9.6-Tb/s Integrated Packet Processor, Traffic Manager, and Fabric Interface Single-Chip Device," Jul. 13, 2022, 98 Pages.
Openconfig-qos.yang, Website: https://github.com/openconfig/public/blob/master/release/models/qos/openconfig-qos.yang, Obtained Sep. 8, 2022, 4 Pages.

*Primary Examiner* — Karen C Tang

(57) ABSTRACT

A device may receive network data identifying a topology of network devices of a network, quality of service (QoS) rules for user equipment (UEs) and application flows associated with the network, QoS profiles for a radio access network (RAN) of the network, and service data flow (SDF) templates. The device may process the network data, with a model, to calculate a network device service level agreement (SLA) score, for each of the network devices on a sliding window, to generate network device SLA scores, and may aggregate the network device SLA scores to generate an end-to-end SLA score on the sliding window. The device may generate QoS configuration data based on the end-to-end SLA score, and may implement the QoS configuration data.

20 Claims, 12 Drawing Sheets

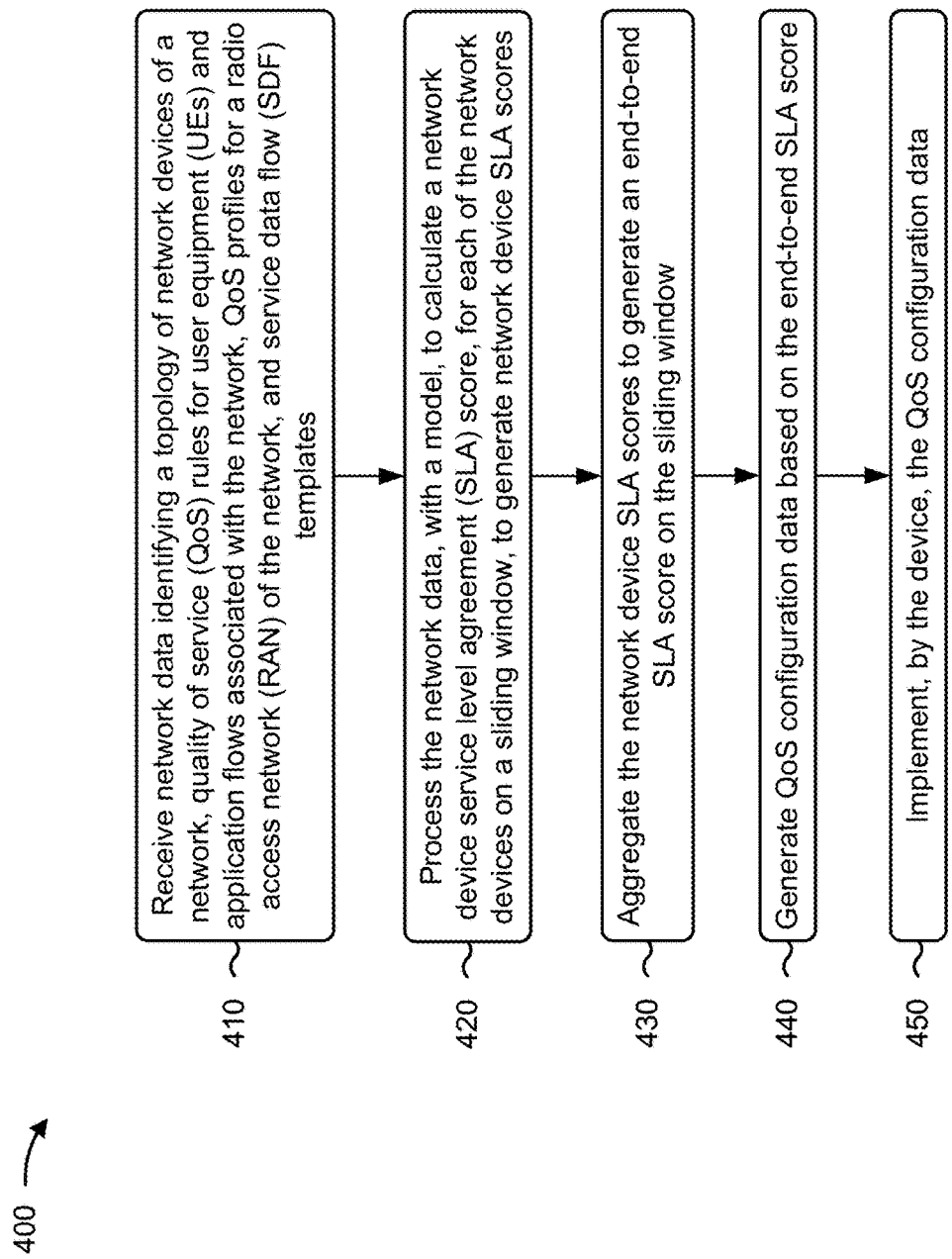

SYSTEMS AND METHODS FOR CONTROL OF APPLICATIONS BASED ON QUALITY OF SERVICE MONITORING

BACKGROUND

A quality of service (QoS) is the use of mechanisms that work on a network (e.g., a fifth generation (5G) network) to control traffic and ensure performance of critical applications with limited network capacity. QoS may enable organizations to adjust overall network traffic by prioritizing specific high-performance applications.

BRIEF DESCRIPTION OF THE DRAWINGS

FIG. 4 is a flowchart of an example process for QoS monitoring and control of applications.

DETAILED DESCRIPTION OF EXAMPLE EMBODIMENTS

Figure 1A:
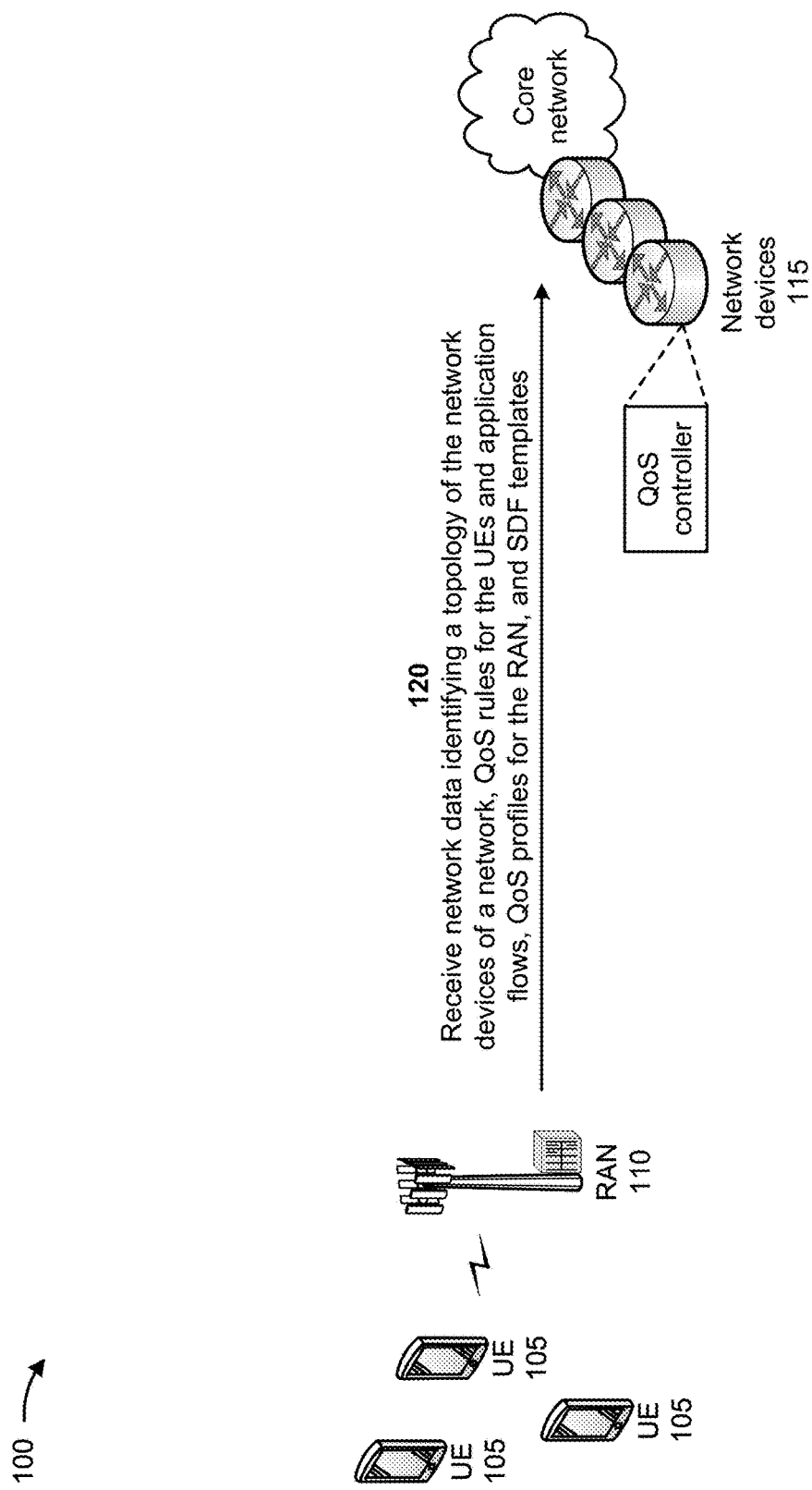
FIGS. 1A-1I are diagrams of an example associated with QoS monitoring and control of applications.

The following detailed description of example implementations refers to the accompanying drawings. The same reference numbers in different drawings may identify the same or similar elements.

5G network slicing is a network architecture that enables multiplexing of virtualized and independent logical networks on a same physical network infrastructure. Each network slice is an isolated end-to-end network tailored to fulfill diverse requirements requested by a particular application. However, 5G network slicing is limited to a few traffic engineered tunnels without closed-loop QoS monitoring and control of the tunnels. This makes guaranteeing the QoS for particular applications extremely difficult. Thus, current mechanisms for providing QoS for 5G applications consume computing resources (e.g., processing resources, memory resources, communication resources, and/or the like), networking resources, and/or other resources associated with failing to provide a QoS for an application requiring the QoS, handling complaints associated with a QoS of an application, unnecessarily utilizing network resources for an application not requiring a QoS instead of an application requiring the QoS, losing traffic associated with an application due to poor QoS, and/or the like.

Some implementations described herein provide a network device that provides QoS monitoring and control of applications. For example, the network device may receive network data identifying a topology of network devices of a network, QoS rules for user equipment (UEs) and application flows associated with the network, QoS profiles for a radio access network (RAN) of the network, and service data flow (SDF) templates. The network device may process the network data, with a model, to calculate a network device service level agreement (SLA) score for each of the network devices, on a sliding window, to generate network device SLA scores, and may aggregate the network device SLA scores to generate an end-to-end SLA score on the sliding window. The network device may generate QoS configuration data based on the end-to-end SLA score, and may implement the QoS configuration data. The network device may receive feedback associated with implementing the QoS configuration data, and may update the QoS configuration data, based on the feedback, to generate updated QoS configuration data. The network device may implement the updated QoS configuration data.

In this way, the network device provides QoS monitoring and control of applications. For example, the network device may provide granular monitoring and control of a QoS for each application flow. When applied to 5G network slicing, the network device may improve visibility and controllability of 5G network slices. The network device may monitor QoS state associated with a service, a user equipment (UE), the network device, a port of the network device, and/or the like, and may determine QoS configuration data based on the QoS state. The network device may implement the QoS configuration data to control a QoS of each application flow. Thus, the network device may conserve computing resources, networking resources, and/or other resources that would otherwise have been consumed in failing to provide a QoS for an application requiring the QoS, handling complaints associated with a QoS of an application, unnecessarily utilizing network resources for an application not requiring a QoS instead of an application requiring the QoS, losing traffic associated with an application due to poor QoS, and/or the like.

FIGS. 1A-1I are diagrams of an example 100 associated with QoS monitoring and control of applications. As shown in FIGS. 1A-1I, example 100 includes a plurality of UEs 105, a radio access network (RAN) 110, and a core network with plurality of network devices 115. In some implementations, each of the network devices 115 may include a QoS controller that provides QoS monitoring and control of applications. Further details of the plurality of UEs 105, the RAN 110, the core network, the plurality of network devices 115, and the QoS controller are provided elsewhere herein.

As shown in FIG. 1A, and by reference number 120, the network device 115 (e.g., the QoS controller) may receive network data identifying a topology of the network devices of a network, QoS rules for the UEs 105 and application flows, QoS profiles for the RAN 110, and service data flow (SDF) templates. For example, the network device 115 may continuously receive the network data from the UEs 105, the RAN 110, and/or the other network devices 115, may periodically receive the network data from the UEs 105, the RAN 110, and/or the other network devices 115, may receive the network data based on requesting the network data from the UEs 105, the RAN 110, and/or the other network devices 115, and/or the like.

The network data identifying the topology of the network devices may include data identifying locations of the UEs 105, the RAN 110, and the other network devices 115, a quantity of the UEs 105, the RAN 110, and the other network devices 115, characteristics of the UEs 105, the RAN 110, and the other network devices 115, how the RAN 110, the other network devices 115, and connections are physically or logically arranged in relation to each other, and/or the like. The QoS rules for the UEs 105 and the application flows may include customized settings that instruct the UEs 105 and/or the other network devices 115 to which types of traffic to give priority. Each rule may assign priorities to different types of connections, and the other network devices 115 may utilize the different priorities to filter bandwidth for the UEs 105 and/or the application flows. Each of the QoS profiles for the RAN 110 may include a self-contained set of QoS classes and rules that are utilized to control communication from the UEs 105 to the other network devices 115, from the other network devices 115 to the UEs 105, and/or the like. Each of the SDF templates may include a template that describes a flow of packets which represent a service being delivered to a subscriber, such as a flow of voice packets associated with a call or streaming data from a website.

Figure 1B:
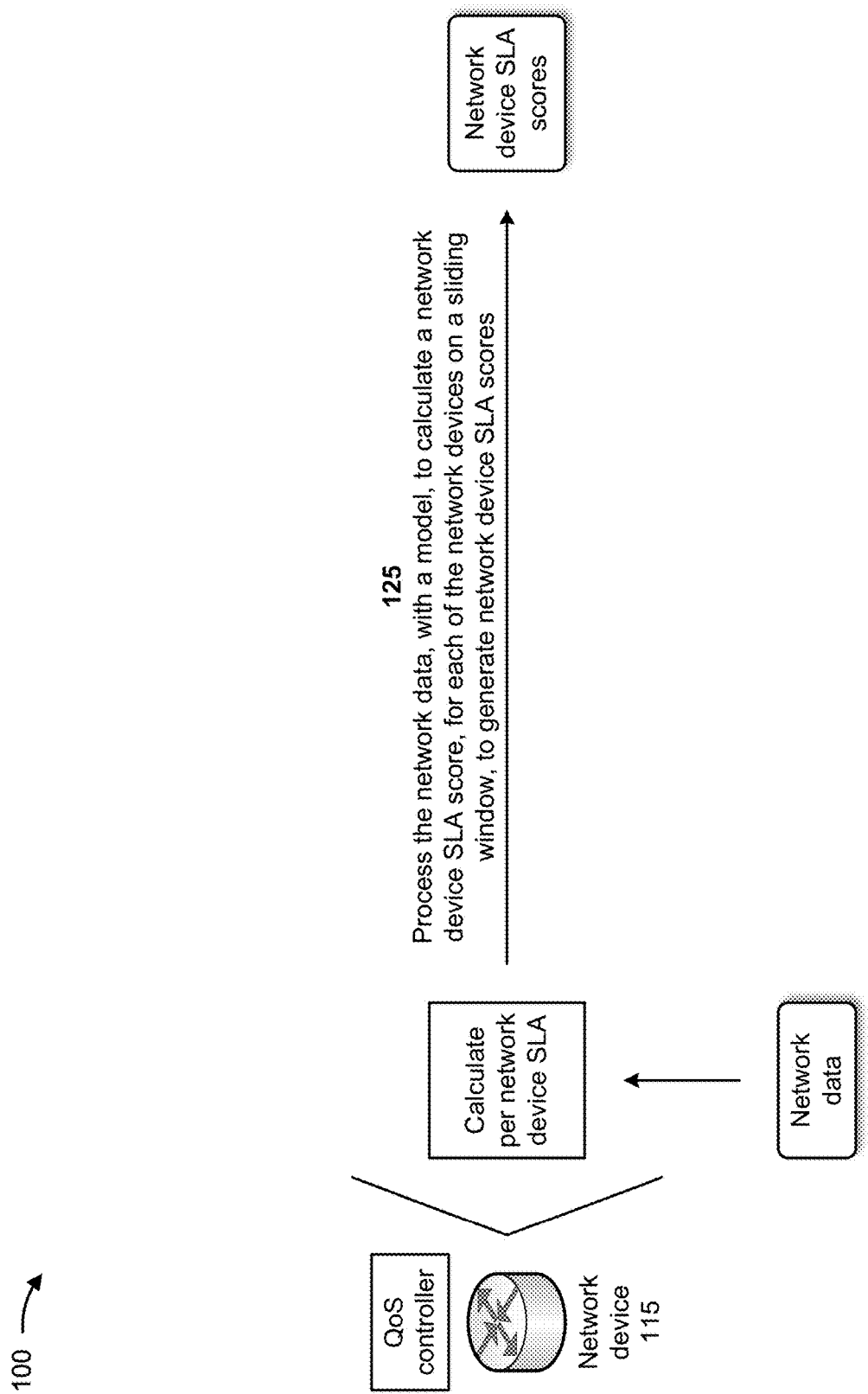

As shown in FIG. 1B, and by reference number 125, the network device 115 (e.g., the QoS controller) may process the network data, with a model, to calculate a network device SLA score for each of the network devices 115, on a sliding window, to generate network device SLA scores. For example, an SLA defines QoS requirements (e.g., bandwidth, throughput, latency, and/or the like) without specifying a technology to be used in order to deliver a particular service. In 5G, an SLA may reflect the QoS related to pre-defined network slice types. The model may include a sliding window model that is utilized to filter out transient spikes/dips of time series data (e.g., the network data) and obtain a representation of SLA states (e.g., via the SLA scores). In some implementations, the sliding window model may utilize an exponential weighted moving average to calculate a network device SLA score (SLA score) based on the network data (v), as follows:

$$SLA\ score = w*v(t) + (1-w)*SLA\ score(t-1),$$

where $0 \leq w \leq 1$ is a weight and t is a time. The exponential weighted moving average may utilize multiple or different weights and/or terms based on the scenario, but the calculation follows the same concept. In some implementations, the sliding window model may include other types of calculations. The network device 115 may process the network data, with the SLA sliding window model (e.g., the exponential weighted moving average), to calculate the network device SLA scores for the network devices 115 on a sliding window.

In some implementations, the sliding window may include an absolute window in time (e.g., in milliseconds) that slides across system time over a set of time series statistics. The network device 115 may utilize the window to filter a set of QoS statistics collected from a data plane for QoS tuning actions. The network device 115 may utilize the tuning actions to adjust device QoS resource configurations (e.g., tuning parameters) to minimize system-wide SLA violations. Both the window interval and advancing rate may be adjustable and may be controlled by the QoS controller based on severities and frequencies of the SLA violations (e.g., SLA violation category scores or SLA scores).

The network device 115 may advance a window start time, may extend a window end time, or both. The decision may be based on historical SLA violations and historical tuning actions. For example, if no SLA violation has occurred in the past thirty milliseconds, then the sliding window may advance the start time to current time. However, if the SLA is violated and tuning actions are being issued, the sliding window may keep the start time, but increase the end time to calculate an effectiveness of the tuning actions.

The network device 115 may calculate the sliding window per subscriber and per service triggered by an SLA violation. The network device 115 may determine an SLA violation based on an ingress-to-egress packet latency, a quantity of bytes transmitted during the sliding window, a quantity of dropped packets per sliding window per subscriber and per service, and/or the like.

Inputs to a tuning action may include a 5G QoS flow identifier, ingress to queue packet latency, ingress to egress packet latency, average queue utilization, queue dropped packets, exceeding scheduler policy packet count, violating scheduler policy packet count, a quantity of active queues, a total packet buffer size, a shared buffer size, an allocated buffer size, an average of time of active queues, a total throughput, and/or the like. The inputs may be classified into categories, such as throughput, latency, a queue dropped severity, a scheduler dropped severity, a queue utilization, and a total buffer utilization.

Based on the SLA scores of each category, the tuning parameters may be utilized to tune a queue drop threshold, a queue drop probability, and scheduler packet and drop rates for conforming, exceeding, and violating packets assigned to a violating SLA (e.g., a resource assigned to a subscriber service). System wide, queue number may be adjusted to merge low priority traffic into fewer queues, to reallocate the queue buffer to high priority traffic, and/or the like.

In some implementations, the sliding window QoS control may be reactive to an SLA violation in a current sliding window. In some implementations, a prediction parameter may be added to the inputs of the sliding window calculation. The prediction may be calculated based on historical data and may provide predicted scores in each of the violation categories for the next n number of sliding windows. Based on the predictions, the tuning parameters derived from the reactive control may be re-adjusted based on future predictions. An effectiveness of the tuning may be collected and provided as feedback to the QoS controller so that the QoS controller is tuned continuously based on the feedback loop.

Figure 1C:
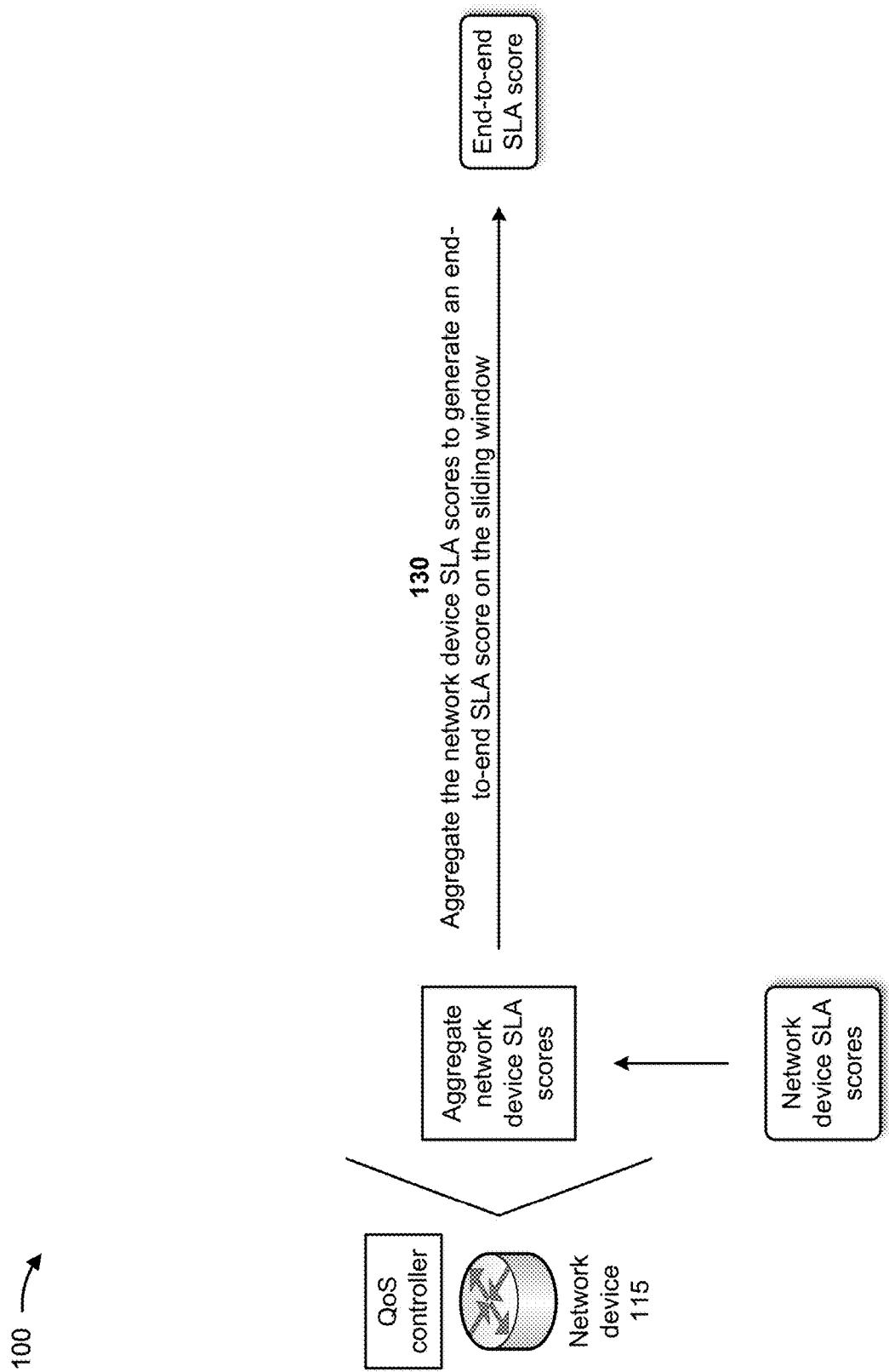

As shown in FIG. 1C, and by reference number 130, the network device 115 (e.g., the QoS controller) may aggregate the network device SLA scores to generate an end-to-end SLA score on the sliding window. For example, the network device 115 may add the network device SLA scores together to generate the end-to-end SLA score on the sliding window. In some implementations, the network device 115 may apply different weights to the network device SLA scores to generate weighted network device SLA scores, and may add the weighted network device SLA scores together to generate the end-to-end SLA score on the sliding window.

Figure 1D:
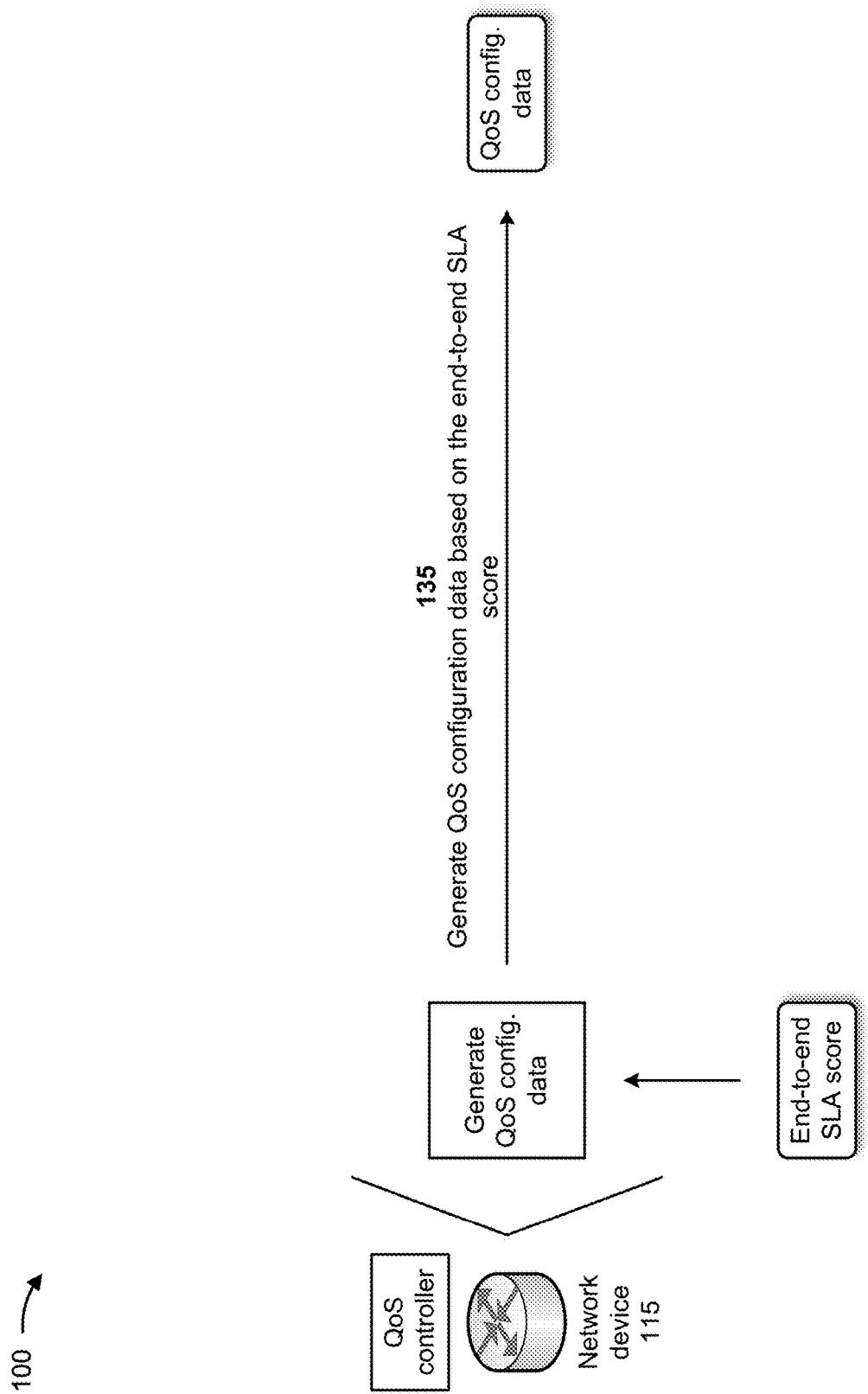

As shown in FIG. 1D, and by reference number 135, the network device 115 (e.g., the QoS controller) may generate QoS configuration data based on the end-to-end SLA score. For example, the network device 115 may modify existing QoS configuration data, based on the end-to-end SLA score, to generate the QoS configuration data. In some implementations, the network device 115 may create the QoS configuration data based on the end-to-end SLA score. In some implementations, the QoS configuration data may include data identifying terms associated with the application flows, actions associated with the application flows, forwarding groups associated with the application flows, and/or the like. The QoS configuration data may include data identifying a minimum threshold and a maximum threshold of an ingress queue or an egress queue of the network device 115, an explicit congestion notification of the ingress queue or the egress queue of the network device 115, a packet drop criterion of the ingress queue or the egress queue of the network device 115, a weight applied to the ingress queue or the egress queue of the network device 115, a maximum packet drop probability of the ingress queue or the egress queue of the network device 115, and/or the like.

In some implementations, the QoS configuration data may include data identifying a queuing behavior of a QoS scheduler policy of the network device 115, a maximum queue length of the QoS scheduler policy of the network device 115, a conforming action of the QoS scheduler policy of the network device 115, an exceeding action of the QoS scheduler policy of the network device 115, a violating action of the QoS scheduler policy of the network device 115, and/or the like. The QoS configuration data may include data identifying an end-to-end classification, queuing, scheduling behaviors, a length of a queue of the network device 115, a minimum packet drop threshold for the queue, a maximum packet drop threshold for the queue, a scheduler model of the network device 115, a length of a shaper queue of the network device 115, a configuration on committed, burst packet rates for a scheduler of the network device 115, a shaping policy or a policing policy at each aggregation level, and/or the like.

Figure 1E:
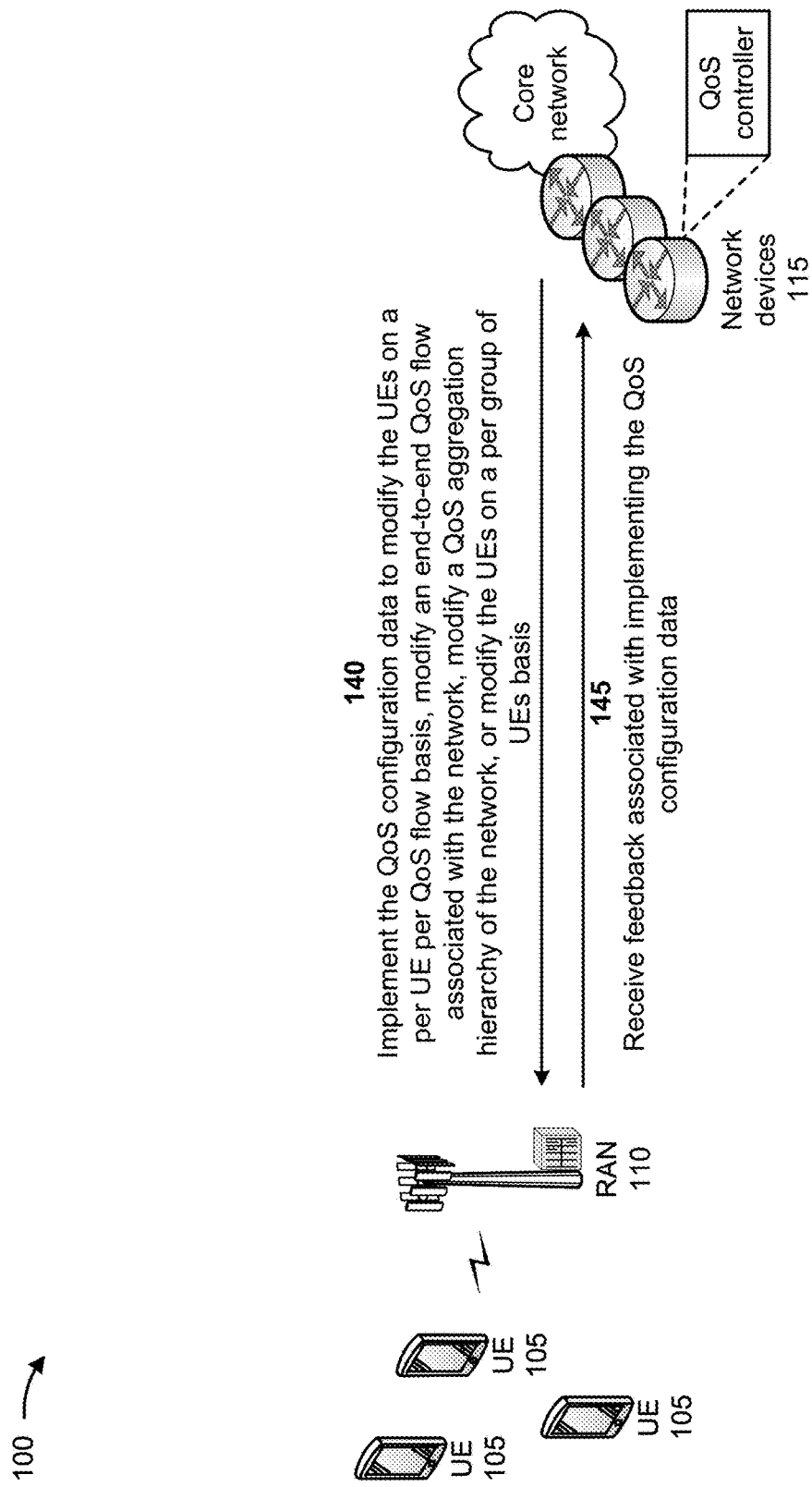

As shown in FIG. 1E, and by reference number 140, the network device 115 (e.g., the QoS controller) may implement the QoS configuration data to modify the UEs 105 on a per UE per QoS flow basis, modify an end-to-end QoS flow associated with the network, modify a QoS aggregation hierarchy of the network, or modify the UEs 105 on a per group of UEs basis. For example, the network device 115 may implement the QoS configuration data to cause the network device 115 to modify QoS flows associated with the UEs 105 on a per UE per QoS flow basis, modify an end-to-end QoS flow associated with the core network, modify a QoS aggregation hierarchy associated with the core network, modify the QoS flows associated with the UEs 105 on a per group of UEs basis, and/or the like. In some implementations, when implementing the QoS configuration data, the network device 115 may implement the QoS configuration data to modify a queue of the network device 115, modify forwarding rules of the network device 115, modify a scheduler of the network device 115, modify events associated with the network device 115, and/or the like.

As further shown in FIG. 1E, and by reference number 145, the network device 115 (e.g., the QoS controller) may receive feedback associated with implementing the QoS configuration data. For example, after implementing the QoS configuration data, the network device 115 may monitor a state of the network device 115 as the feedback associated with implementing the QoS configuration data. In some implementations, when receiving the feedback associated with implementing the QoS configuration data, the network device 115 may receive a state associated with a queue of the network device 115, may receive a state associated with a scheduler of the network device 115, may receive a flow state associated with the network device 115, may receive a latency associated with the network device 115, where the state associated with the queue, the state associated with the scheduler, the flow state, and the latency may correspond to the feedback associated with implementing the QoS configuration data.

Figure 1F:
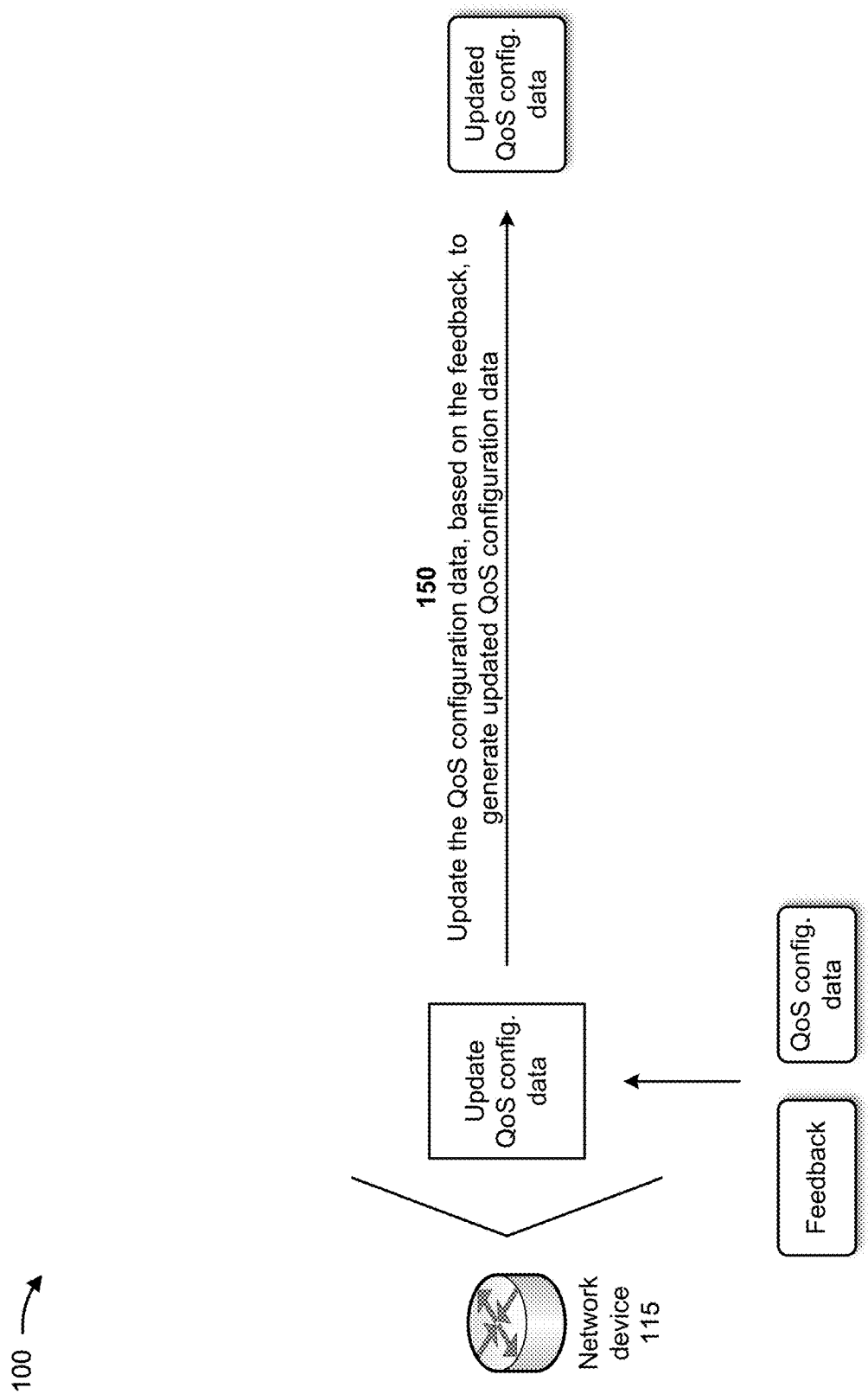

As shown in FIG. 1F, and by reference number 150, the network device 115 (e.g., the QoS controller) may update the QoS configuration data, based on the feedback, to generate updated QoS configuration data. For example, the network device 115 may utilize the feedback to tune the QoS configuration data and to generate the updated QoS configuration data. In some implementations, when updating the QoS configuration data, based on the feedback, to generate the updated QoS configuration data, the network device 115 may update an end-to-end classification associated with the QoS configuration data, may update queuing associated with the QoS configuration data, may update scheduling behaviors associated with the QoS configuration data, and/or the like. In some implementations, when the feedback includes data identifying latency or congestion at the network device 115, the network device 115 may report the latency or the congestion, may modify a queue or a scheduler of the network device 115 based on the latency or the congestion, and/or the like.

Figure 1G:
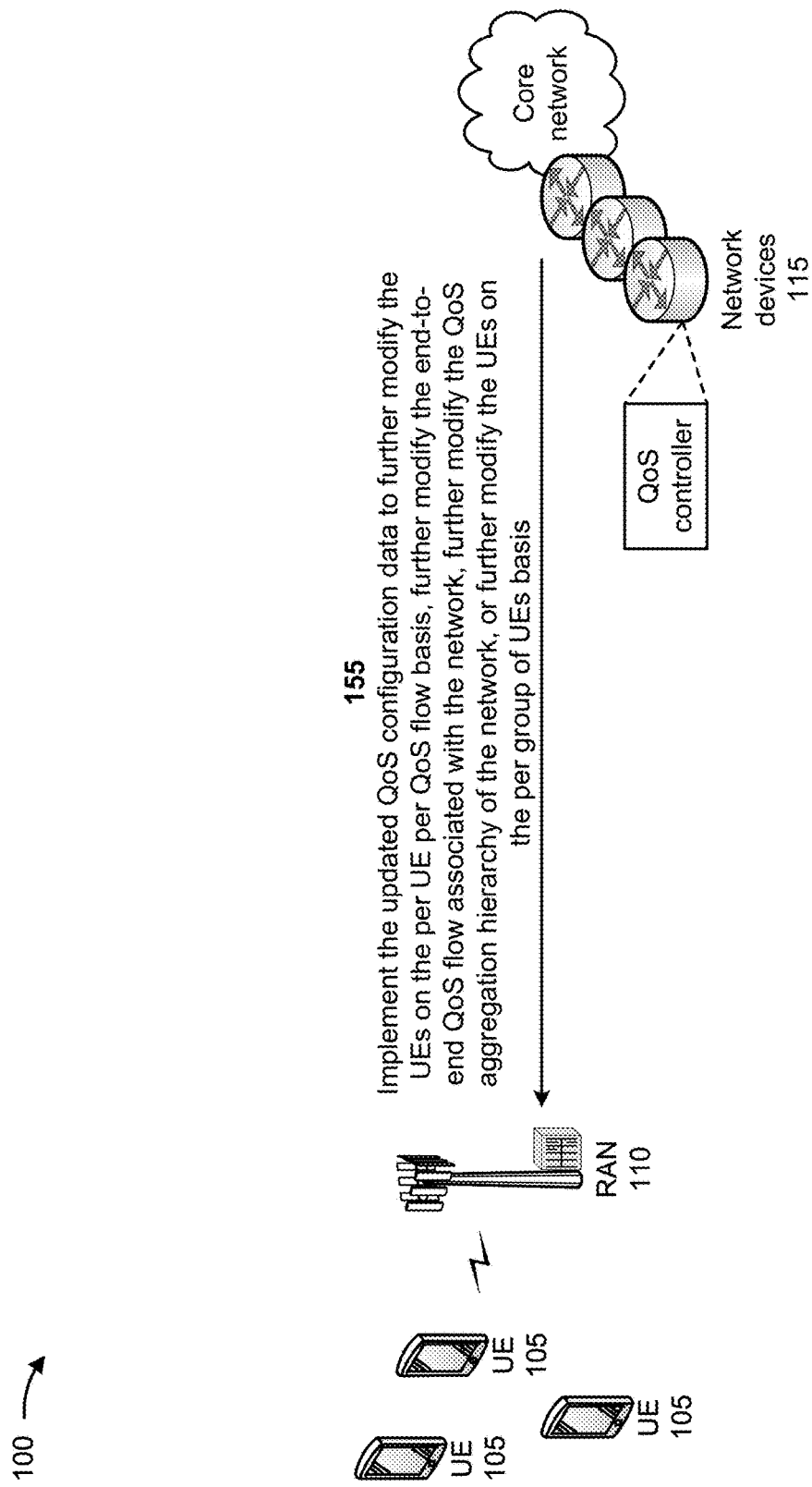

As shown in FIG. 1G, and by reference number 155, the network device 115 (e.g., the QoS controller) may implement the updated QoS configuration data to further modify the UEs 105 on the per UE per QoS flow basis, further modify the end-to-end QoS flow associated with the network, further modify the QoS aggregation hierarchy of the network, or further modify the UEs 105 on the per group of UEs basis. For example, the network device 115 may implement the updated QoS configuration data to cause the network device 115 to further modify the QoS flows associated with the UEs 105 on a per UE per QoS flow basis, to further modify the end-to-end QoS flow associated with the core network, to further modify the QoS aggregation hierarchy associated with the core network, to further modify the QoS flows associated with the UEs 105 on a per group of UEs basis, and/or the like. In some implementations, when implementing the updated QoS configuration data, the network device 115 may implement the updated QoS configuration data to further modify the queue of the network device 115, further modify the forwarding rules of the network device 115, further modify the scheduler of the network device 115, further modify the events associated with the network device 115, and/or the like.

Figure 1H:
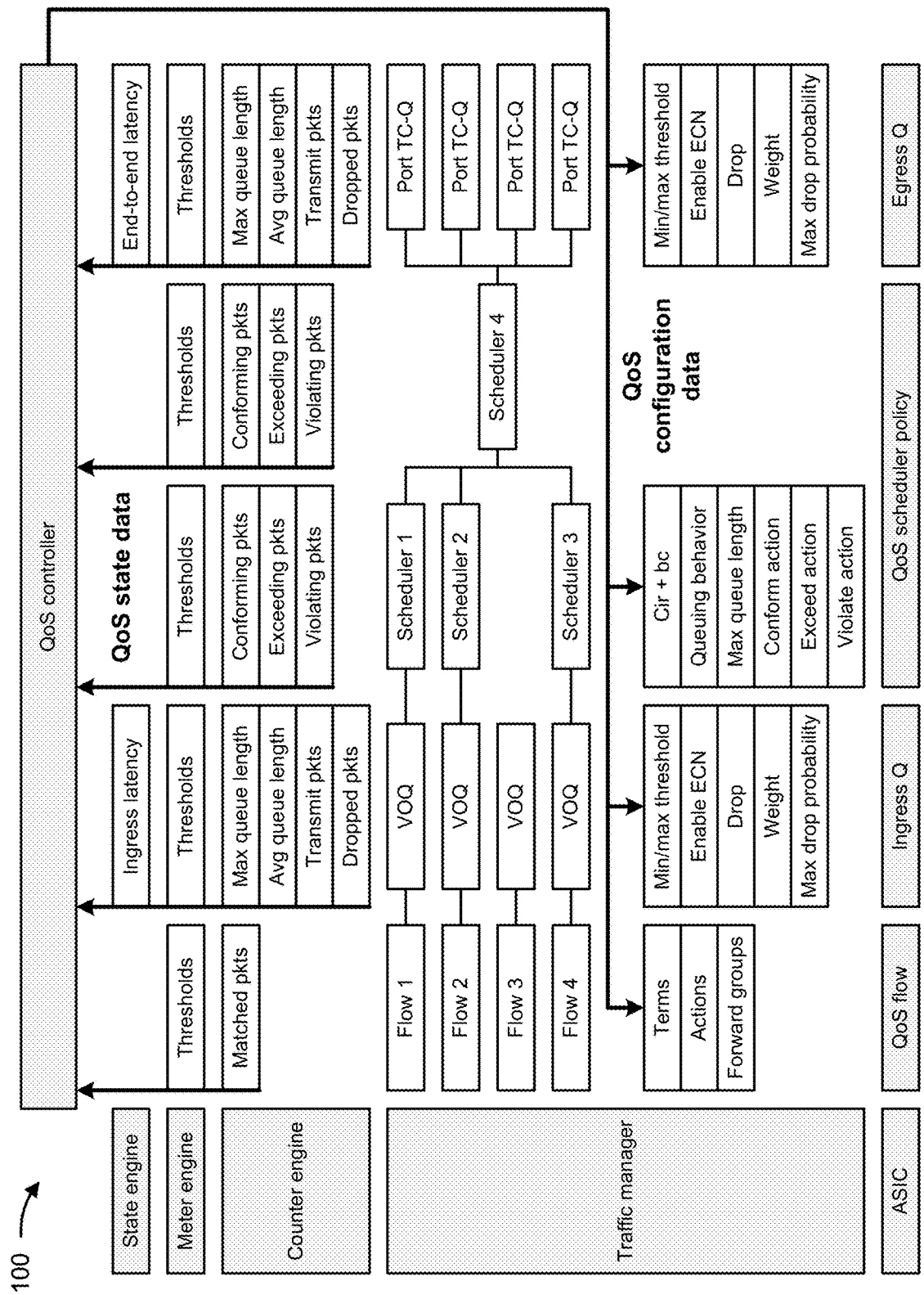

FIG. 1H depicts example components of the network device 115. As shown, the network device 115 may include the QoS controller, a state engine, a meter engine, a counter engine, a traffic manager, an application-specific integrated circuit (ASIC), a QoS flow, an ingress queue, a QoS scheduler policy, and an egress queue. The QoS flow may generate flows (e.g., flow 1, flow 2, flow 3, and flow 4) via the traffic manager. The meter engine may determine QoS thresholds associated with the flows, and the counter engine may identify matched packets associated with the flows. The ingress queue may provide a virtual output queue (VOQ) for each of the flows, via the traffic manager. The state engine may determine an ingress latency associated with the VOQs, and the meter engine may determine QoS thresholds associated with the VOQs. The counter engine may identify a maximum queue length of each VOQ, an average queue length of each VOQ, a quantity of transmitted packets by each VOQ, and a quantity of dropped packets by each VOQ.

The QoS scheduler policy may provide schedulers (e.g., scheduler 1, scheduler 2, scheduler 3, and scheduler 4) for the VOQs, via the traffic manager. The meter engine may determine QoS thresholds associated with the schedulers, and the counter engine may identify conforming packets, exceeding packets, and violating packets associated with the schedulers. The egress queue may provide ports for the schedulers, via the traffic manager. The state engine may determine an end-to-end latency associated with the ports, and the meter engine may determine QoS thresholds associated with the ports. The counter engine may identify a maximum queue length of each port, an average queue length of each port, a quantity of transmitted packets by each port, and a quantity of dropped packets by each port.

The QoS controller may receive QoS state data identifying the QoS thresholds associated with the flows, the matched packets associated with the flows, the ingress latency associated with the VOQs, the QoS thresholds associated with the VOQs, the maximum queue length of each VOQ, the average queue length of each VOQ, the quantity of transmitted packets by each VOQ, the quantity of dropped packets by each VOQ, the QoS thresholds associated with the schedulers, the conforming packets associated with the schedulers, the exceeding packets associated with the schedulers, the violating packets associated with the schedulers, the end-to-end latency associated with the ports, the QoS thresholds associated with the ports, the maximum queue length of each port, the average queue length of each port, the quantity of transmitted packets by each port, and the quantity of dropped packets by each port.

The QoS controller may generate QoS configuration data based on the QoS state data. For example, the QoS controller may generate QoS configuration data that includes data identifying terms associated with the flows, actions associated with the flows, and/or forward groups associated with the application flows. In some implementations, the QoS controller may generate QoS configuration data that includes data identifying a minimum threshold and a maximum threshold of an ingress queue or an egress queue of the network device 115, an explicit congestion notification (ECN) of the ingress queue or the egress queue of the network device 115, a packet drop criterion of the ingress queue or the egress queue of the network device 115, a weight applied to the ingress queue or the egress queue of the network device 115, and/or a maximum packet drop probability of the ingress queue or the egress queue of the network device 115. In some implementations, the QoS controller may generate QoS configuration data that includes data identifying a queuing behavior of the QoS scheduler policy of the network device 115, a maximum queue length of the QoS scheduler policy of the network device 115, a conforming action of the QoS scheduler policy of the network device 115, an exceeding action of the QoS scheduler policy of the network device 115, and/or a violating action of the QoS scheduler policy of the network device 115.

Figure 1I:
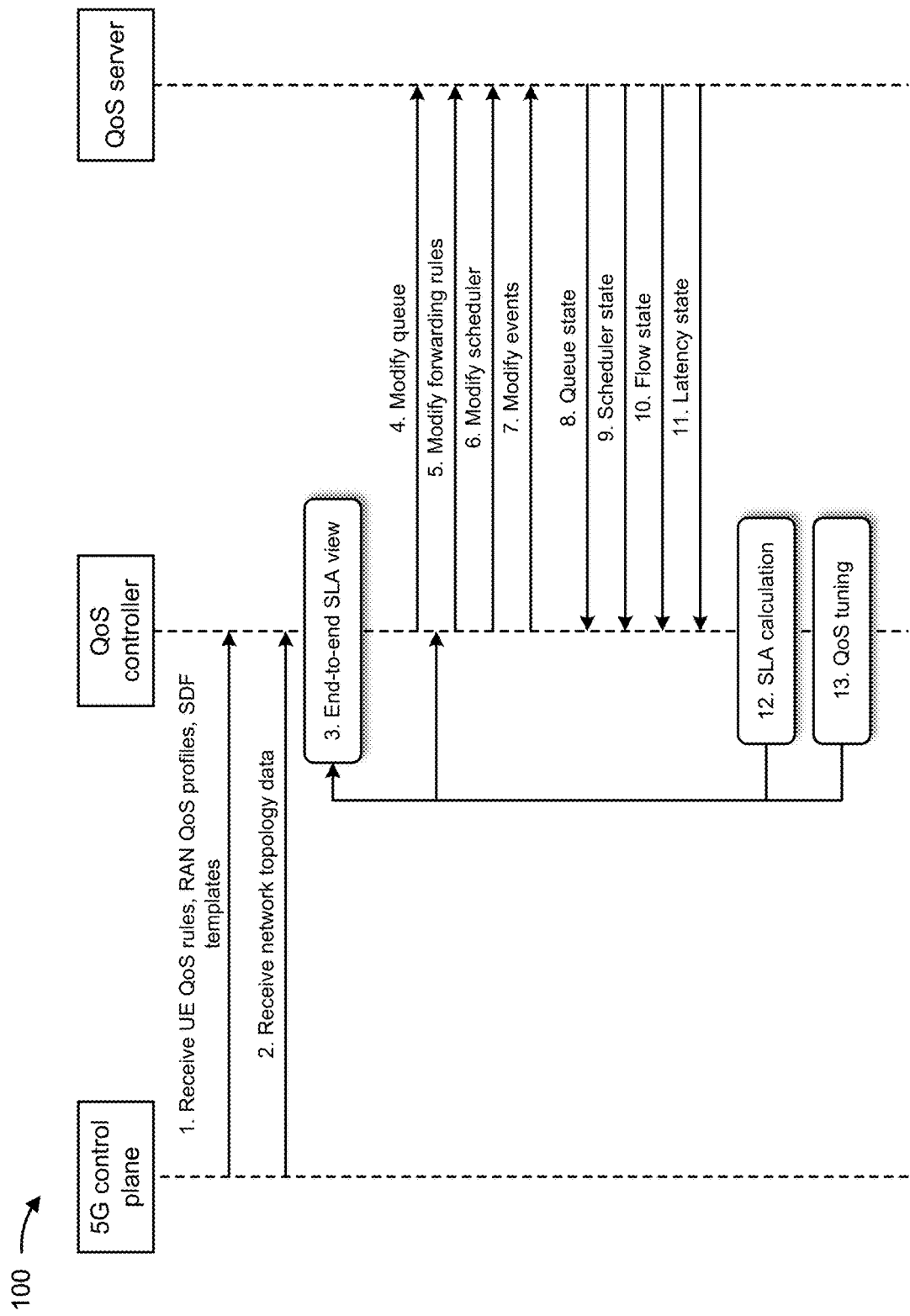

FIG. 1I depicts an example of a call flow diagram associated with a 5G control plane, the QoS controller, and a QoS server of the network device 115. As shown at step 1, the QoS controller may receive the UE QoS rules, the RAN QoS profiles, and the SDF templates, as described above. As shown at step 2, the QoS controller may receive the network topology data, as described above. As shown at step 3, the QoS controller may provide an end-to-end SLA view associated with the UE QoS rules, the RAN QoS profiles, the SDF templates, and the network topology data. For example, the QoS controller may process the UE QoS rules, the RAN QoS profiles, the SDF templates, and the network topology data, with the sliding window model, to calculate a network device SLA score, for each of the network devices 115 on a sliding window, to generate network device SLA scores. The QoS controller may aggregate the network device SLA scores to generate an end-to-end SLA score on the sliding window, and may generate QoS configuration data based on the end-to-end SLA score.

As shown by steps 4-7 of FIG. 1I, the QoS configuration data may cause the QoS to modify a queue of the network device 115, modify forwarding rules of the network device 115, modify a scheduler of the network device 115, and modify events associated with the network device 115. The QoS server may implement the modifications and may generate state data based on implementing the modifications. As shown at steps 8-11, the QoS server may generate and the QoS controller may receive data identifying a queue state, a scheduler state, a flow state, and a latency state. As shown at step 12, the QoS controller may process the state data, with the sliding window model, to recalculate network device SLA scores and to aggregate the recalculated network device SLA scores to generate a recalculated end-to-end SLA score on the sliding window. A shown at step 13, the QoS controller may utilize the recalculated end-to-end SLA score to further modify the queue, the forwarding rules, the scheduler, and/or the events.

In this way, the network device 115 provides QoS monitoring and control of applications. For example, the network device 115 may provide granular monitoring and control of a QoS for each application flow. When applied to 5G network slicing, the network device 115 may improve visibility and controllability of 5G network slices. The network device 115 may monitor a QoS state associated with a service, a UE 105, the network device 115, a port of the network device 115, and/or the like, and may determine QoS configuration data based on the QoS state. The network device 115 may implement the QoS configuration data to control a QoS of each application flow. Thus, the network device 115 may conserve computing resources, networking resources, and/or other resources that would otherwise have been consumed in failing to provide a QoS for an application requiring the QoS, handling complaints associated with a QoS of an application, unnecessarily utilizing network resources for an application not requiring a QoS instead of an application requiring the QoS, losing traffic associated with an application due to poor QoS, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
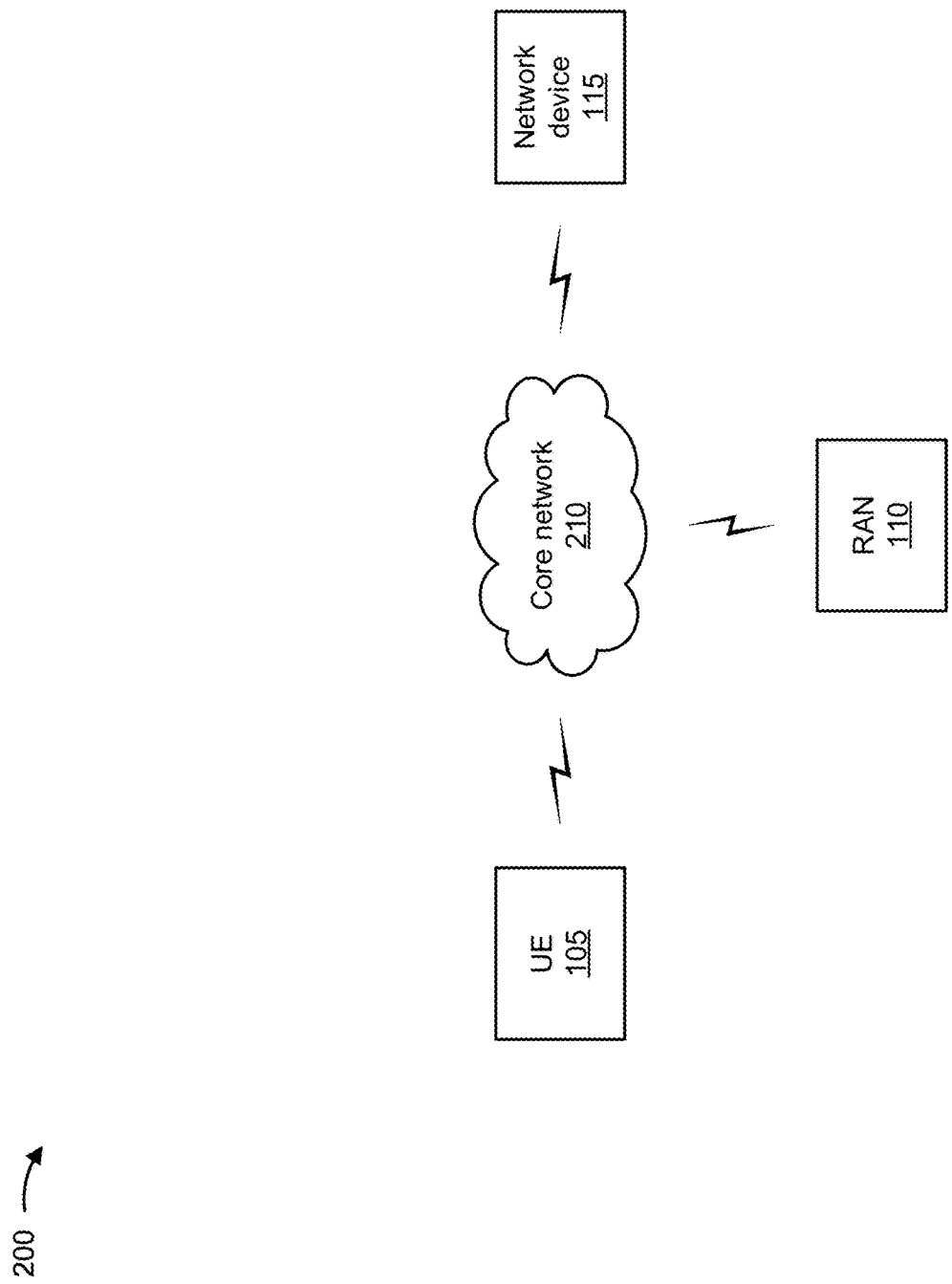
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a UE 105, a RAN 110, a network device 115, and a core network 210. Devices and/or elements of the environment 200 may interconnect via wired connections and/or wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or a core network. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

The network device 115 may include one or more devices capable of receiving, processing, storing, routing, and/or providing traffic (e.g., a packet and/or other information or metadata) in a manner described herein. For example, the network device 115 may include a router, such as a label switching router (LSR), a label edge router (LER), an ingress router, an egress router, a provider router (e.g., a provider edge router or a provider core router), a virtual router, or another type of router. Additionally, or alternatively, the network device 115 may include a gateway, a switch, a firewall, a hub, a bridge, a reverse proxy, a server (e.g., a proxy server, a cloud server, or a data center server), a load balancer, and/or a similar device. In some implementations, the network device 115 may be a physical device implemented within a housing, such as a chassis. In some implementations, the network device 115 may be a virtual device implemented by one or more computing devices of a cloud computing environment or a data center. In some implementations, a group of network devices 115 may be a group of data center nodes that are used to route traffic flow through a network.

In some implementations, the network device 115 may be a functional element of an example architecture of a 5G next generation (NG) core network included in a 5G wireless telecommunications system. For example, the network device may be a new functional element of the 5G core network, a network slice selection function (NSSF), a network exposure function (NEF), an authentication server function (AUSF), a unified data management (UDM) component, a policy control function (PCF), an application function (AF), an access and mobility management function (AMF), a session management function (SMF), and/or a user plane function (UPF). These functional elements may be communicatively connected via a message bus.

The core network 210 may include one or more wired and/or wireless networks. For example, the core network 210 may include a cellular network (e.g., a 5G network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The core network 210 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
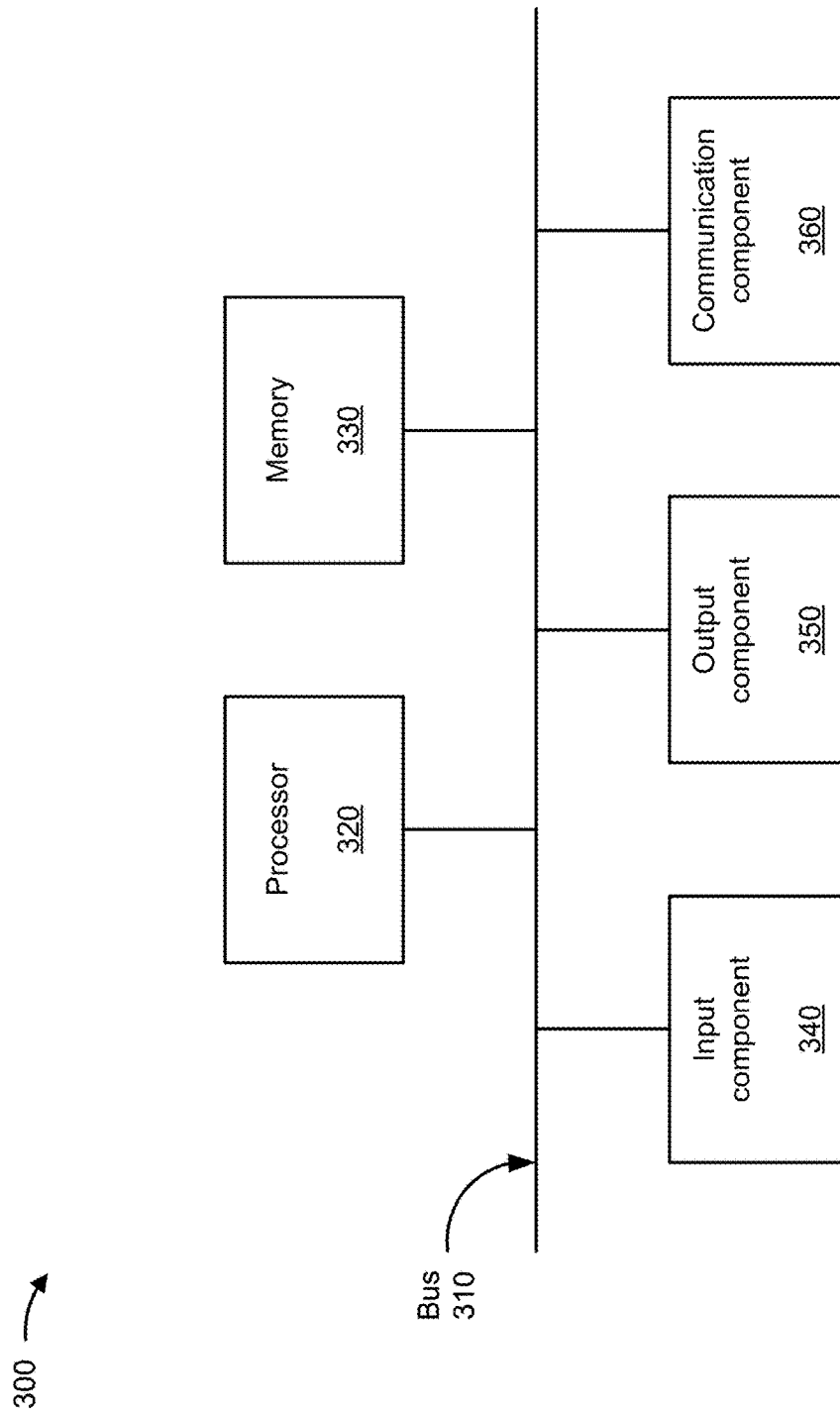
FIG. 3 is a diagram of example components of one or more devices of FIG. 2.

FIG. 3 is a diagram of example components of a device 300, which may correspond to the UE 105, the RAN 110, and/or the network device 115. In some implementations, the UE 105, the RAN 110, and/or the network device 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for QoS monitoring and control of applications. In some implementations, one or more process blocks of FIG. 4 may be performed by a device (e.g., the network device 115). In some implementations, one or more process blocks of FIG. 4 may be performed by another device or a group of devices separate from or including the device, such as a network device (e.g., the network device 115). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving network data identifying a topology of network devices of a network, QoS rules for UEs and application flows associated with the network, QoS profiles for a RAN of the network, and SDF templates (block 410). For example, the device may receive network data identifying a topology of network devices of a network, QoS rules for UEs and application flows associated with the network, QoS profiles for a RAN of the network, and SDF templates, as described above.

As further shown in FIG. 4, process 400 may include processing the network data, with a model, to calculate a network device SLA score, for each of the network devices on a sliding window, to generate network device SLA scores (block 420). For example, the device may process the network data, with a model, to calculate a network device SLA score, for each of the network devices on a sliding window, to generate network device SLA scores, as described above.

As further shown in FIG. 4, process 400 may include aggregating the network device SLA scores to generate an end-to-end SLA score on the sliding window (block 430). For example, the device may aggregate the network device SLA scores to generate an end-to-end SLA score on the sliding window, as described above.

As further shown in FIG. 4, process 400 may include generating QoS configuration data based on the end-to-end SLA score (block 440). For example, the device may generate QoS configuration data based on the end-to-end SLA score, as described above. In some implementations, the QoS configuration data includes data identifying one or more of terms associated with the application flows, actions associated with the application flows, or forward groups associated with the application flows.

In some implementations, the QoS configuration data includes data identifying one or more of a minimum threshold and a maximum threshold of an ingress queue or an egress queue of the device, an explicit congestion notification of the ingress queue or the egress queue of the device, a packet drop criterion of the ingress queue or the egress queue of the device, a weight applied to the ingress queue or the egress queue of the device, or a maximum packet drop probability of the ingress queue or the egress queue of the device.

In some implementations, the QoS configuration data includes data identifying one or more of a queuing behavior of a QoS scheduler policy of the device, a maximum queue length of the QoS scheduler policy of the device, a conforming action of the QoS scheduler policy of the device, an exceeding action of the QoS scheduler policy of the device, or a violating action of the QoS scheduler policy of the device.

In some implementations, the QoS configuration data includes data identifying one or more of an end-to-end classification, queuing, or scheduling behaviors. In some implementations, the QoS configuration data includes data identifying one or more of a length of a queue of the device, a minimum packet drop threshold for the queue, a maximum packet drop threshold for the queue, a scheduler model of the device, a length of a shaper queue of the device, a configuration on committed, burst packet rates for a scheduler of the device, or a shaping policy or a policing policy at each aggregation level.

As further shown in FIG. 4, process 400 may include implementing the QoS configuration data (block 450). For example, the device may implement the QoS configuration data, as described above. In some implementations, implementing the QoS configuration data includes implementing the QoS configuration data to one or more of modify the UEs on a per UE per QoS flow basis, modify an end-to-end QoS flow associated with the network, modify a QoS aggregation hierarchy of the network, or modify the UEs on a per group of UEs basis. In some implementations, implementing the QoS configuration data includes implementing the QoS configuration data to one or more of modify a queue of the device, modify forwarding rules of the device, modify a scheduler of the device, or modify events associated with the device.

In some implementations, process 400 includes receiving feedback associated with implementing the QoS configuration data, updating the QoS configuration data, based on the feedback, to generate updated QoS configuration data, and implementing the updated QoS configuration data. In some implementations, implementing the updated QoS configuration data includes implementing the QoS configuration data to one or more of modify the UEs on a per UE per QoS flow basis, modify an end-to-end QoS flow associated with the network, modify a QoS aggregation hierarchy of the network, or modify the UEs on a per group of UEs basis.

In some implementations, receiving the feedback associated with implementing the QoS configuration data includes one or more of receiving a state associated with a queue of the device, receiving a state associated with a scheduler of the device, receiving a flow state associated with the device, or receiving a latency associated with the device. In some implementations, updating the QoS configuration data, based on the feedback, to generate the updated QoS configuration data includes one or more of updating an end-to-end classification associated with the QoS configuration data, updating queuing associated with the QoS configuration data, or updating scheduling behaviors associated with the QoS configuration data.

In some implementations, process 400 includes detecting latency or congestion at the device, reporting the latency or the congestion, and modifying a queue or a scheduler of the device based on the latency or the congestion.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, network data identifying a topology of network devices of a network, quality of service (QoS) rules for user equipment (UEs) and application flows associated with the network, QoS profiles for a radio access network (RAN) of the network, and service data flow (SDF) templates;
    processing, by the device, the network data, with a model, to calculate a network device service level agreement (SLA) score, for each of the network devices on a sliding window, to generate network device SLA scores;
    aggregating, by the device, the network device SLA scores to generate an end-to-end SLA score on the sliding window;
    generating, by the device, QoS configuration data based on the end-to-end SLA score; and
    implementing, by the device, the QoS configuration data.

2. The method of claim 1, wherein implementing the QoS configuration data comprises:
    implementing the QoS configuration data to one or more of:
        modify the UEs on a per UE per QoS flow basis,
        modify an end-to-end QoS flow associated with the network,
        modify a QoS aggregation hierarchy of the network, or
        modify the UEs on a per group of UEs basis.

3. The method of claim 1, further comprising:
    receiving feedback associated with implementing the QoS configuration data;
    updating the QoS configuration data, based on the feedback, to generate updated QoS configuration data; and
    implementing the updated QoS configuration data.

4. The method of claim 3, wherein implementing the updated QoS configuration data comprises:

implementing the QoS configuration data to one or more of:
   modify the UEs on a per UE per QoS flow basis,
   modify an end-to-end QoS flow associated with the network,
   modify a QoS aggregation hierarchy of the network, or
   modify the UEs on a per group of UEs basis.

5. The method of claim 3, wherein receiving the feedback associated with implementing the QoS configuration data comprises one or more of:
   receiving a state associated with a queue of the device;
   receiving a state associated with a scheduler of the device;
   receiving a flow state associated with the device; or
   receiving a latency associated with the device.

6. The method of claim 3, wherein updating the QoS configuration data, based on the feedback, to generate the updated QoS configuration data comprises one or more of:
   updating an end-to-end classification associated with the QoS configuration data;
   updating queuing associated with the QoS configuration data; or
   updating scheduling behaviors associated with the QoS configuration data.

7. The method of claim 1, wherein the QoS configuration data includes data identifying one or more of:
   terms associated with the application flows,
   actions associated with the application flows, or
   forward groups associated with the application flows.

8. A device, comprising:
   one or more processors configured to:
      receive network data identifying a topology of network devices of a network, quality of service (QoS) rules for user equipment (UEs) and application flows associated with the network, QoS profiles for a radio access network (RAN) of the network, and service data flow (SDF) templates;
      process the network data, with a model, to calculate a network device service level agreement (SLA) score, for each of the network devices on a sliding window, to generate network device SLA scores;
      aggregate the network device SLA scores to generate an end-to-end SLA score on the sliding window;
      generate QoS configuration data based on the end-to-end SLA score;
      implement the QoS configuration data;
      receive feedback associated with implementing the QoS configuration data;
      update the QoS configuration data, based on the feedback, to generate updated QoS configuration data; and
      implement the updated QoS configuration data.

9. The device of claim 8, wherein the QoS configuration data includes data identifying one or more of:
   a minimum threshold and a maximum threshold of an ingress queue or an egress queue of the device,
   an explicit congestion notification of the ingress queue or the egress queue of the device,
   a packet drop criterion of the ingress queue or the egress queue of the device,
   a weight applied to the ingress queue or the egress queue of the device, or
   a maximum packet drop probability of the ingress queue or the egress queue of the device.

10. The device of claim 8, wherein the QoS configuration data includes data identifying one or more of:
   a queuing behavior of a QoS scheduler policy of the device,
   a maximum queue length of the QoS scheduler policy of the device,
   a conforming action of the QoS scheduler policy of the device,
   an exceeding action of the QoS scheduler policy of the device, or
   a violating action of the QoS scheduler policy of the device.

11. The device of claim 8, wherein the one or more processors, to implement the QoS configuration data, are configured to:
   implement the QoS configuration data to one or more of:
      modify a queue of the device,
      modify forwarding rules of the device,
      modify a scheduler of the device, or
      modify events associated with the device.

12. The device of claim 8, wherein the QoS configuration data includes data identifying one or more of:
   an end-to-end classification,
   queuing, or
   scheduling behaviors.

13. The device of claim 8, wherein the QoS configuration data includes data identifying one or more of:
   a length of a queue of the device,
   a minimum packet drop threshold for the queue,
   a maximum packet drop threshold for the queue,
   a scheduler model of the device,
   a length of a shaper queue of the device,
   a configuration on committed, burst packet rates for a scheduler of the device, or
   a shaping policy or a policing policy at each aggregation level.

14. The device of claim 8, wherein the one or more processors are further configured to:
   detect latency or congestion at the device;
   report the latency or the congestion; and
   modify a queue or a scheduler of the device based on the latency or the congestion.

15. A non-transitory computer-readable medium storing a set of instructions, the set of instructions comprising:
   one or more instructions that, when executed by one or more processors of a device, cause the device to:
      receive network data identifying a topology of network devices of a network, quality of service (QoS) rules for user equipment (UEs) and application flows associated with the network, QoS profiles for a radio access network (RAN) of the network, and service data flow (SDF) templates;
      process the network data, with a model, to calculate a network device service level agreement (SLA) score, for each of the network devices on a sliding window, to generate network device SLA scores;
      aggregate the network device SLA scores to generate an end-to-end SLA score on the sliding window;
      generate QoS configuration data based on the end-to-end SLA score; and
      implement the QoS configuration data to modify the UEs on a per UE per QoS flow basis, modify an end-to-end QoS flow associated with the network, modify a QoS aggregation hierarchy of the network, or modify the UEs on a per group of UEs basis.

16. The non-transitory computer-readable medium of claim 15, wherein the one or more instructions further cause the device to:
   receive feedback associated with implementing the QoS configuration data;

update the QoS configuration data, based on the feedback, to generate updated QoS configuration data; and implement the updated QoS configuration data to further modify the UEs on the per UE per QoS flow basis, further modify the end-to-end QoS flow associated with the network, further modify the QoS aggregation hierarchy of the network, or further modify the UEs on the per group of UEs basis.

17. The non-transitory computer-readable medium of claim 16, wherein the one or more instructions, that cause the device to receive the feedback associated with implementing the QoS configuration data, cause the device to one or more of:

receive a state associated with a queue of the device;
receive a state associated with a scheduler of the device;
receive a flow state associated with the device; or
receive a latency associated with the device.

18. The non-transitory computer-readable medium of claim 16, wherein the one or more instructions, that cause the device to update the QoS configuration data, based on the feedback, to generate the updated QoS configuration data, cause the device to one or more of:

update an end-to-end classification associated with the QoS configuration data;
update queuing associated with the QoS configuration data; or
update scheduling behaviors associated with the QoS configuration data.

19. The non-transitory computer-readable medium of claim 15, wherein the one or more instructions, that cause the device to implement the QoS configuration data, cause the device to:

implement the QoS configuration data to one or more of:
modify a queue of the device,
modify forwarding rules of the device,
modify a scheduler of the device, or
modify events associated with the device.

20. The non-transitory computer-readable medium of claim 15, wherein the QoS configuration data includes data identifying one or more of:

a length of a queue of the device,
a minimum packet drop threshold for the queue,
a maximum packet drop threshold for the queue,
a scheduler model of the device,
a length of a shaper queue of the device,
a configuration on committed, burst packet rates for a scheduler of the device, or
a shaping policy or a policing policy at each aggregation level.

* * * * *